(12) United States Patent
Hamada

(10) Patent No.: US 12,441,063 B2
(45) Date of Patent: Oct. 14, 2025

(54) THREE-DIMENSIONAL PRINT DATA GENERATION METHOD, AND MANUFACTURING METHOD FOR THREE-DIMENSIONAL FABRICATED PRODUCT

(71) Applicant: Murata Manufacturing Co., Ltd., Kyoto (JP)

(72) Inventor: Shu Hamada, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 183 days.

(21) Appl. No.: 18/498,418

(22) Filed: Oct. 31, 2023

(65) Prior Publication Data

US 2024/0059018 A1 Feb. 22, 2024

Related U.S. Application Data

(63) Continuation of application No. PCT/JP2022/008361, filed on Feb. 28, 2022.

(30) Foreign Application Priority Data

May 18, 2021 (JP) ................................. 2021-084006

(51) Int. Cl.
*B29C 64/386* (2017.01)
*B33Y 50/00* (2015.01)
(Continued)

(52) U.S. Cl.
CPC ............ *B29C 64/386* (2017.08); *B33Y 50/00* (2014.12); *B29C 64/112* (2017.08); *B29C 64/118* (2017.08); *B29C 64/165* (2017.08); *B33Y 10/00* (2014.12)

(58) Field of Classification Search
CPC ..... B29C 64/386; B29C 64/393; B33Y 50/00; B33Y 50/02
See application file for complete search history.

(56) References Cited

U.S. PATENT DOCUMENTS 5,321,622 A * 6/1994 Snead ................... G03F 7/0037
700/182
8,155,774 B2 * 4/2012 Wu ........................... B29C 64/00
700/98

(Continued)

FOREIGN PATENT DOCUMENTS

EP 2287722 A1 * 2/2011 ........... G06K 15/021
JP 2012-096426 A 5/2012

(Continued)

OTHER PUBLICATIONS

International Search Report for PCT/JP2022/008361 dated Apr. 5, 2022.

*Primary Examiner* — Atul P. Khare
(74) *Attorney, Agent, or Firm* — McDonald Hopkins LLC

(57) ABSTRACT

A three-dimensional print data generation method is capable of matching the number of layers and/or size of slice data. Three-dimensional interpolation shape data is generated by interpolating a three-dimensional interpolation shape on three-dimensional shape data having a plurality of three-dimensional shapes composed of different materials. The three-dimensional interpolation shape defines an outline in slice data, and a shape disposed outside of the maximum outline of the three-dimensional shape on the deposition surface of the three-dimensional print and is continuous from the bottommost end to the topmost end of the three-dimensional shape in the layering direction of the three-dimensional print. The three-dimensional shape and the three-dimensional interpolation shape for each three-dimensional shape are sliced in the three-dimensional interpolation (Continued)

shape data to generate a plurality of items of interpolation slice data. A plurality of items of slice data are generated by deleting the three-dimensional interpolation shape so as to leave outline information.

20 Claims, 16 Drawing Sheets

(51) Int. Cl.
  *B29C 64/112* (2017.01)
  *B29C 64/118* (2017.01)
  *B29C 64/165* (2017.01)
  *B33Y 10/00* (2015.01)
  *B33Y 30/00* (2015.01)

(56) References Cited

U.S. PATENT DOCUMENTS

| | | | |
|---|---|---|---|
| 11,186,042 B2 * | 11/2021 | Sakaki | B22F 10/80 |
| 11,364,687 B2 * | 6/2022 | Gonzalez | B29C 64/393 |
| 11,886,781 B2 * | 1/2024 | Yokoyama | B29C 64/153 |
| 2016/0263836 A1 * | 9/2016 | Yoshida | B29C 64/386 |
| 2020/0271502 A1 | 8/2020 | Chen et al. | |
| 2021/0331400 A1 | 10/2021 | Gonzalez et al. | |

FOREIGN PATENT DOCUMENTS

| | | |
|---|---|---|
| JP | 2016-168692 A | 9/2016 |
| JP | 2021-501071 A | 1/2021 |
| JP | 2021-507834 A | 2/2021 |

* cited by examiner

THREE-DIMENSIONAL PRINT DATA GENERATION METHOD, AND MANUFACTURING METHOD FOR THREE-DIMENSIONAL FABRICATED PRODUCT

CROSS REFERENCE TO RELATED APPLICATION

This is a continuation of International Application No. PCT/JP2022/008361 filed on Feb. 28, 2022 which claims priority from Japanese Patent Application No. 2021-084006 filed on May 18, 2021. The contents of these applications are incorporated herein by reference in their entireties.

BACKGROUND OF THE DISCLOSURE

Field of the Disclosure

The present disclosure relates to a three-dimensional print data generation method and a method of manufacturing a three-dimensional shaped article.

Description of the Related Art

Various methods are known as methods of manufacturing three-dimensional shaped articles. Among them, a method of relatively easily manufacturing a three-dimensional shaped article made of a plurality of materials include a material extrusion method, a material jetting method, and a binder jetting method can be exemplified. In these methods, for each material, three-dimensional printing is performed in which the material is deposited on the deposition surface and the material is stacked in the stacking direction intersecting the deposition surface.

In a method of manufacturing a three-dimensional shaped article, it is known to generate a plurality of slice data obtained by slicing a three-dimensional shape as three-dimensional print data (for example, refer to Patent Document 1).

CITATION LIST

Patent Document

Patent Document 1: Japanese Unexamined Patent Application, Publication No. 2016-168692

BRIEF SUMMARY OF THE DISCLOSURE

Here, when a three-dimensional shaped article made of a plurality of materials is prepared, it is conceivable to generate a plurality of slice data obtained by slicing a three-dimensional shape separately for each material as three-dimensional print data within three-dimensional shape data made of a plurality of materials. In this case, if the outer shape of the three-dimensional shape differs for each material, the number of layers and/or the size (volume) of the slice data will differ for each material. For example, if the outer shape of the three-dimensional shape differs for each material in the stacking direction of the three-dimensional print, then the number of layers of the slice data of the three-dimensional shape will differ for each material. On the other hand, if the outer shape of the three-dimensional shape for each material is different in a direction along the deposition surface of the three-dimensional print, then the size of the slice data of the three-dimensional shape for each material will be different.

The present disclosure provides a three-dimensional print data generation method and a method of manufacturing a three-dimensional shaped article capable of matching the number of layers and size of slice data.

A three-dimensional print data generation method according to an embodiment of the present disclosure is directed to a method of generating three-dimensional print data including a plurality of pieces of slice data for a three-dimensional print that deposits a material on a deposition surface and stacks the material in a stacking direction intersecting the deposition surface based on three-dimensional shape data. The three-dimensional shape data have a plurality of three-dimensional shapes, and the plurality of three-dimensional shapes exclude non-manifolds, do not intersect each other, and are made of different materials from each other. The method includes a shape interpolation step of interpolating a three-dimensional interpolation shape in the three-dimensional shape data and generating three-dimensional interpolation shape data defining the plurality of three-dimensional shapes and the three-dimensional interpolation shape, in which the three-dimensional interpolation shape is an interpolation shape for defining an outline in the plurality of pieces of slice data, provided outside a maximum outline of the plurality of three-dimensional shapes on the deposition surface of the three-dimensional print, and is continuous from a lowest end to an uppermost end of the plurality of three-dimensional shapes in the stacking direction of the three-dimensional print, a slice step of slicing the three-dimensional shape and the three-dimensional interpolation shape for each of the plurality of three-dimensional shapes in the three-dimensional interpolation shape data and generating a plurality of pieces of interpolation slice data, and a shape deletion step of deleting the three-dimensional interpolation shape from the plurality of pieces of interpolation slice data to leave outline information defined by the three-dimensional interpolation shape and generating a plurality of pieces of slice data.

A method of manufacturing a three-dimensional shaped article according to an embodiment of the present disclosure includes performing three-dimensional printing to manufacture a three-dimensional shaped article using three-dimensional print data generated by the above three-dimensional print data generation method.

According to the present disclosure, it is possible to match the number of layers or the size of slice data of each of different kinds of materials.

DETAILED DESCRIPTION OF THE DISCLOSURE

Figure 1:
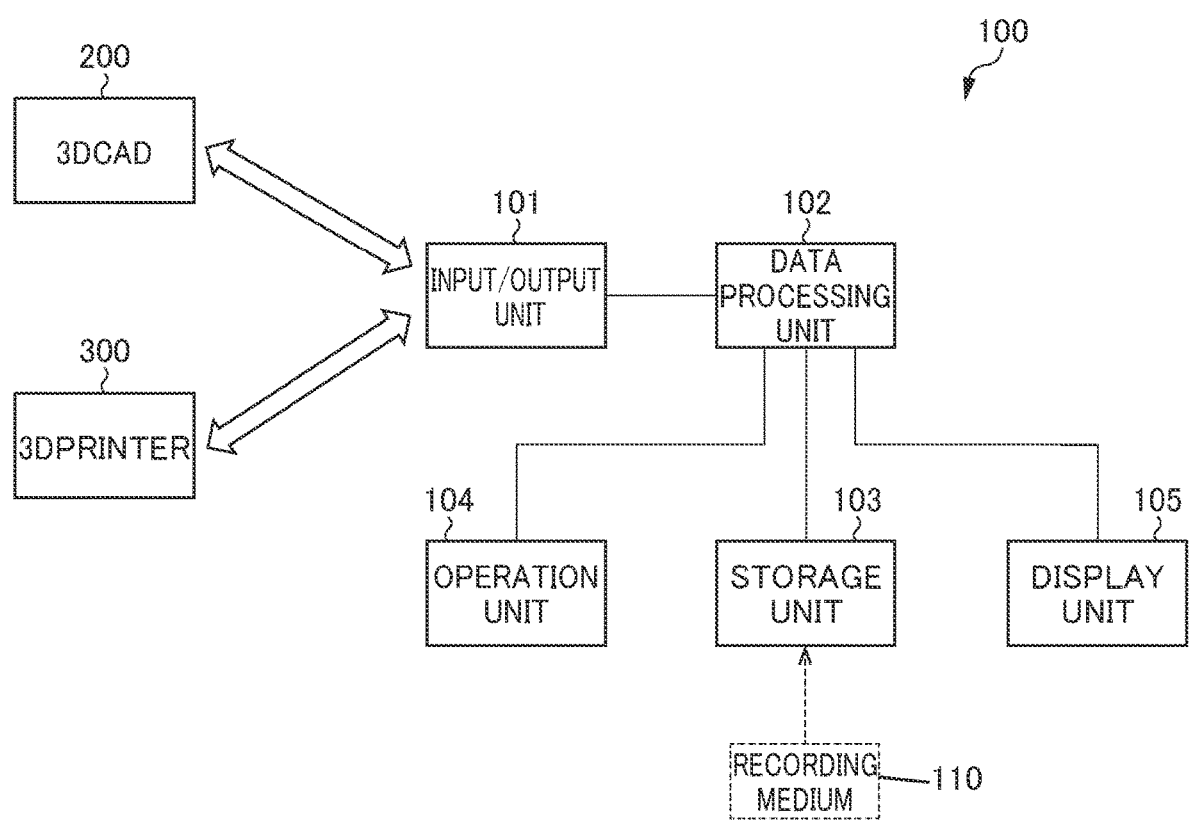
FIG. 1 is a diagram of an example of a schematic configuration of a three-dimensional print data generation apparatus according to an embodiment of the present disclosure.

An embodiment of the present disclosure will now be described with reference to the accompanying drawings. In the drawings, the same or corresponding portions are denoted by the same reference numerals.

FIG. 1 is a diagram of an example of a schematic configuration of a three-dimensional print data generation apparatus according to the present embodiment. A three-dimensional print data generation apparatus 100 shown in FIG. 1 generates three-dimensional print data including a plurality of pieces of slice data for three-dimensional printing by a three-dimensional printer 300 from three-dimensional shape data generated by a three-dimensional shape data generation apparatus such as a three-dimensional CAD (Computer-Aided Design) 200.

The three-dimensional printer 300 performs three-dimensional printing using three-dimensional print data generated by the three-dimensional print data generation apparatus 100, thereby manufacturing a three-dimensional shaped article. Specifically, the three-dimensional printer 300 performs, for each material, three-dimensional printing in which the material is deposited on the deposition surface and the material is stacked in the stacking direction intersecting the deposition surface. Examples of such a three-dimensional printing method include a Fused Deposition Modeling (FDM) method, a material jetting method, and a binder jetting method.

As shown in FIG. 1, the three-dimensional print data generation apparatus 100 includes an input/output unit 101, a data processing unit 102, a storage unit 103, an operation unit 104, and a display unit 105.

The input/output unit 101 inputs three-dimensional shape data from the 3DCAD 200. The input/output unit 101 further outputs the three-dimensional print data generated by the data processing unit 102 to the three-dimensional printer 300. The input/output unit 101 is, for example, a communication interface including a communication circuit conforming to a known wired or wireless communication standard.

The communication standard between the input/output unit 101 and the 3D CAD 200 is not particularly limited, but may be, for example, a wireless communication standard such as a wireless LAN (Local Area Network), LTE (Long Term Evolution), or 3G, or a communication standard such as a wired LAN. Further, the communication standard between the input/output unit 101 and the three-dimensional printer 300 is not particularly limited, and examples thereof include a wireless communication standard such as a wireless LAN (Local Area Network), LTE (Long Term Evolution), or 3G, a communication standard such as a wired LAN, and a so-called short-distance wireless communication standard such as Bluetooth (registered trademark) or Wi-Fi (registered trademark).

The data processing unit 102 generates three-dimensional print data by generating polygon data and slice data from the three-dimensional shape in the three-dimensional shape data. The format of the three-dimensional shape data is not particularly limited, but may be STEP (Standard for the Exchange of Product Model Data), for example. The polygon data is not particularly limited, but may be, for example, STL (Standard Triangulated Language). The slice data is not particularly limited, but includes a combination of a plurality of data of a BMP in an image format and a G code of a numerical control program. Details of the three-dimensional print data generation processing by the data processing unit 102 will be described later.

The data processing unit 102 includes, for example, an arithmetic processor such as a CPU (Central Processing Unit), a DSP (Digital Signal Processor), or a FPGA (Field-Programmable Gate Array). Various functions of the data processing unit 102 are implemented by executing a program (application) stored in the storage unit 103. The program (application) may be provided via a computer network, or may be provided by being recorded on a computer-readable recording medium (computer readable storage medium) 110, such as CD-ROM (Compact Disc Read only memory) or a DVD (Digital Versatile Disc). Examples of the recording medium 110 include other known non-transitory tangible media.

The storage unit 103 stores programs (applications) or data to be executed by the data processing unit 102. The storage unit 103 includes a recording medium or a memory such as ROM (Read Only Memory), RAM (Random Access Memory), BHDD (Hard Disk Drive), a solid state drive (SSD), or a detachable memory card.

The operation unit 104 is an operation unit that is operated by a user. The operation unit 104 includes, for example, a keyboard or mouse having physical operation buttons, or a touch panel having virtual operation buttons.

The display unit 105 displays information to a user. The display unit 105 includes a display, for example, a liquid crystal display or an organic EL display.

Figure 2:
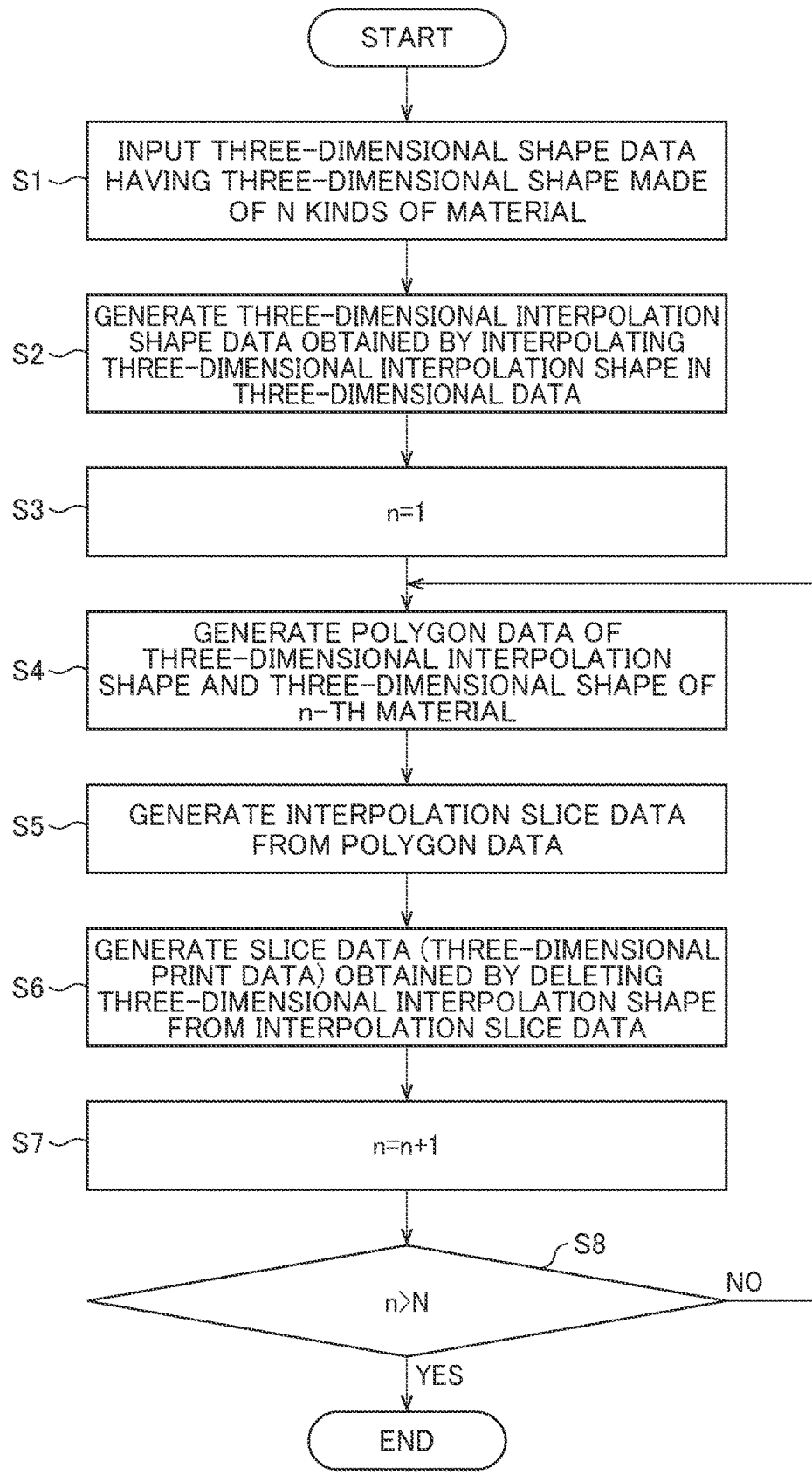
FIG. 2 is a flowchart of an example of a three-dimensional print data generation method according to the present embodiment.

Next, an example of three-dimensional print data generation processing by the three-dimensional print data generation apparatus 100 according to the present embodiment will be described with reference to FIG. 2. FIG. 2 is a flowchart of an example of a three-dimensional print data generation method according to the present embodiment.

First, the input/output unit 101 inputs three-dimensional shape data including three-dimensional shapes including N kinds of materials (N is an integer equal to or greater than 2) (S1). The three-dimensional shape data is, for example, data generated by the three-dimensional CAD 200, and includes three-dimensional shapes (for example, pixel information) of N kinds of materials. The input/output unit 101 designates a specific material for each three-dimensional shape. A material name may be designated in meta information in a file of data generated by the three-dimensional CAD 200. The N types of three-dimensional shapes are not non-manifolds and do not intersect (i.e., do not overlap) each other.

Figure 3A:
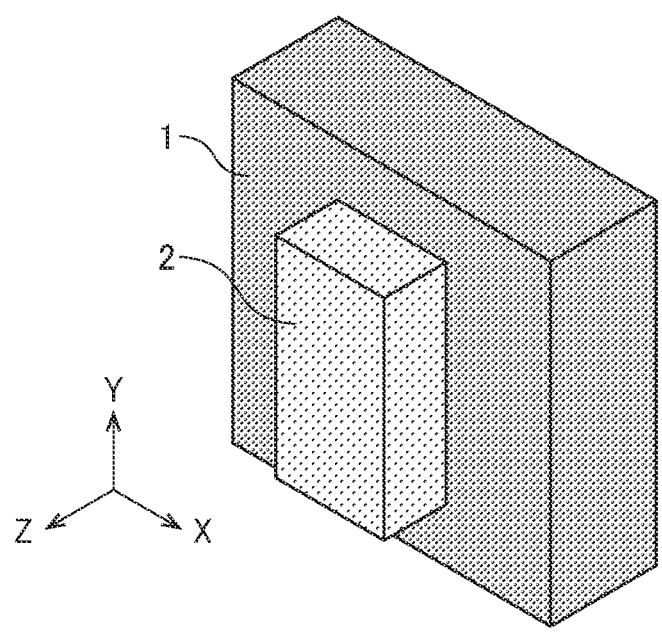
FIG. 3A is a perspective view of an example of a three-dimensional shape in three-dimensional shape data.
Figure 3B:
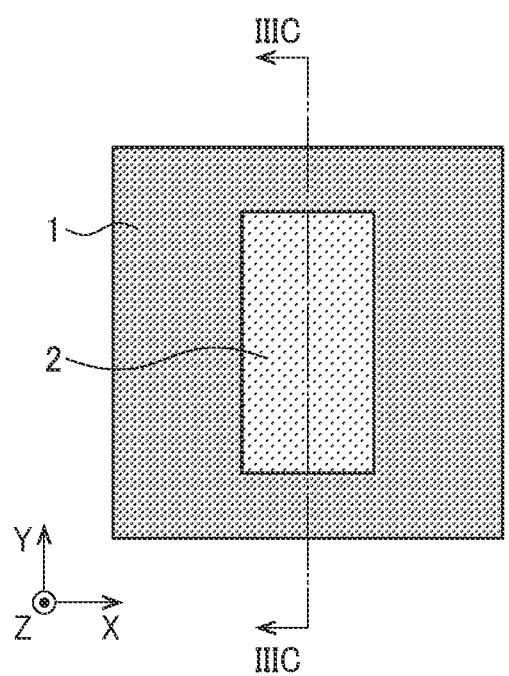
FIG. 3B is an XY plan view of the three-dimensional shape shown in FIG. 3A.
Figure 3C:
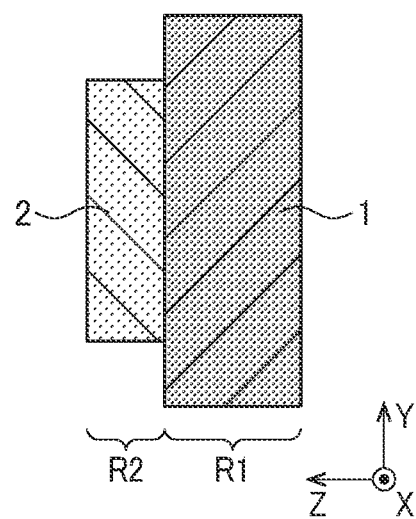
FIG. 3C is a cross-sectional view taken along the line IIIC-IIIC of the three-dimensional shape shown in FIG. 3B, i.e., a YZ cross-sectional view.

An example of a three-dimensional shape in the three-dimensional shape data will be described with reference to FIGS. 3A to 3C. FIG. 3A is a perspective view of an example of a three-dimensional shape in the three-dimensional shape data. FIG. 3B is an XY plan view of the three-dimensional shape shown in FIG. 3A. FIG. 3C is a cross-sectional view taken along the line IIIC-IIIC of the three-dimensional shape shown in FIG. 3B, that is, a YZ cross-sectional view. An XYZ orthogonal coordinate system is shown in FIGS. 3A to 3C (and FIGS. 4A to 8B described later). The XY plane is a deposition surface (deposition forming surface) on which materials are deposited in three-dimensional print, and the Z direction is a stacking direction (stack forming or additive manufacturing direction) on which materials are stacked in three-dimensional print.

In one example of FIGS. 3A to 3C, the three-dimensional shape in the three-dimensional shape data defines a three-dimensional shape 1 (solid body) and a three-dimensional shape 2 (solid body) each made of a different material. The three-dimensional shape 1 is provided in a region R1 on the lower end side in the Z direction (stacking direction), and the three-dimensional shape 2 is provided in a region R2 on the upper end side in the Z direction. That is, the three-dimensional shape 2 is provided on the three-dimensional shape 1 in the Z direction. In the XY plane, the outer shape of the three-dimensional shape 2 is smaller than the outer shape of the three-dimensional shape 1.

Next, the data processing unit 102 interpolates the three-dimensional interpolation shape in the three-dimensional shape data to generate three-dimensional interpolation shape data defining N kinds of three-dimensional shapes and three-dimensional interpolation shapes (shape interpolation step, S2). The three-dimensional interpolation shape data includes information defining a three-dimensional interpolation shape (for example, pixel information) in addition to the three-dimensional shape (for example, pixel information) and material information for each of the N kinds of materials described above.

Figure 4A:
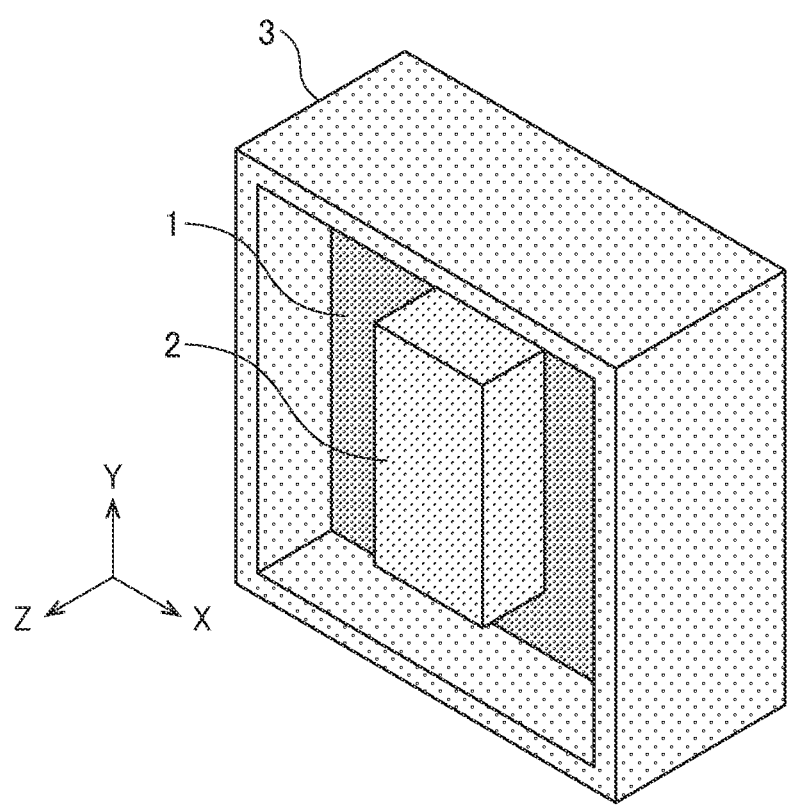
FIG. 4A is a perspective view of an example of a three-dimensional shape and a three-dimensional interpolation shape in three-dimensional interpolation shape data.
Figure 4B:
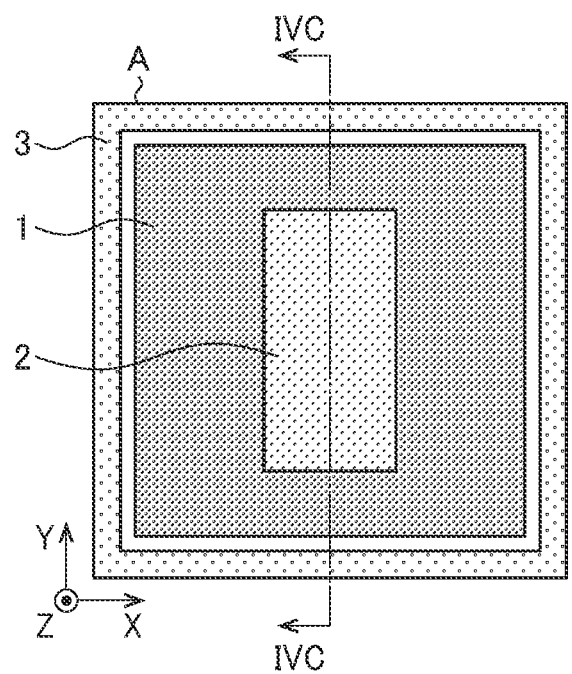
FIG. 4B is an XY plan view of the three-dimensional shape and the three-dimensional interpolation shape shown in FIG. 4A.
Figure 4C:
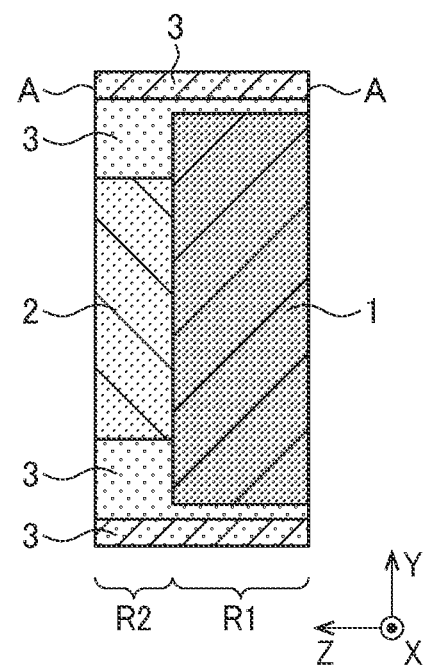
FIG. 4C is a cross-sectional view taken along the line IVC-IVC of the three-dimensional shape and the three-dimensional interpolation shape shown in FIG. 4B, i.e., a YZ cross-sectional view.

An example of a three-dimensional shape and a three-dimensional interpolation shape in the three-dimensional interpolation shape data will be described with reference to FIGS. 4A to 4C. FIG. 4A is a perspective view of an example of a three-dimensional shape and a three-dimensional interpolation shape in the three-dimensional interpolation shape data. FIG. 4B is an XY plan view of the three-dimensional shape and the three-dimensional interpolation shape shown in FIG. 4A. FIG. 4C is a cross-sectional view taken along the line IVC-IVC of the three-dimensional shape and the three-dimensional interpolation shape shown in FIG. 4B, that is, a YZ cross-sectional view.

In one example of FIGS. 4A to 4C, the three-dimensional shape and the three-dimensional interpolation shape in the three-dimensional interpolation shape data defining a three-dimensional interpolation shape 3 (solid body) in addition to the two three-dimensional shapes 1 and 2 described above. The three-dimensional interpolation shape 3 is an interpolation shape for defining the outline A in the slice data. More specifically, the three-dimensional interpolation shape 3 is an interpolation shape for aligning the minimum coordinate value and the maximum coordinate value in the X direction and the minimum coordinate value and the maximum coordinate value in the Y direction (that is, the size of the slice data) in a plurality of slice data for each material. The three-dimensional interpolation shape 3 is an interpolation shape for aligning the minimum coordinate value and the maximum coordinate value in the Z direction (that is, the number of layers of slice data) in a plurality of slice data for each material.

The three-dimensional interpolation shape 3 is provided outside the maximum outline of the plurality of three-dimensional shapes 1 and 2 in the XY plane (the deposition surface of the three-dimensional print), and is a shape continuous in parallel in the Z direction from the lowest end to the uppermost end of the plurality of three-dimensional shapes in the Z direction (the stacking direction of the three-dimensional print), i.e., in the region R1 and the region R2.

The three-dimensional interpolation shape 3 is a frame shape surrounding the maximum outline of the three-dimensional shapes 1 and 2 in the XY plane (the deposition surface of the three-dimensional print). The inner periphery of the three-dimensional interpolation shape 3 may be the same as the outer periphery of the maximum outer shape of the three-dimensional shapes 1 and 2. That is, the inner peripheral surface of the three-dimensional interpolation shape 3 may be in contact with the outer peripheral surface of the maximum outer shape of the three-dimensional shapes 1 and 2.

Alternatively, as shown in FIGS. 4A to 4C, the inner periphery of the three-dimensional interpolation shape 3 may be larger than the outer periphery of the maximum outer shape of the three-dimensional shapes 1 and 2. That is, the inner peripheral surface of the three-dimensional interpolation shape 3 may be separated from the outer peripheral surface of the maximum outer shape of the three-dimensional shapes 1 and 2. The separation distance between the inner peripheral surface of the three-dimensional interpolation shape 3 and the outer peripheral surface of the maximum outer shape of the three-dimensional shapes 1 and 2 may be determined based on, for example, the size (volume) of the polygon. With such a configuration, when generating the polygon data, it is possible to avoid the polygon at the boundary between the three-dimensional shapes 1 and 2 and the three-dimensional interpolation shape 3 from belonging to both the three-dimensional shapes 1 and 2 and the three-dimensional interpolation shape 3.

Next, the increment variable n for the number N of kinds of materials is set to 1 (S3). Next, polygon data of a composite shape of the three-dimensional interpolation shape and the three-dimensional shape of the n-th material is generated (S4). Next, the composite shape of the three-dimensional shape and the three-dimensional interpolation shape in the polygon data is sliced at a predetermined thickness to generate a plurality of interpolation slice data (slice step, S5). At this time, the display unit 105 may display an input screen of various setting values such as a setting value of the polygon mesh in the polygon data and a setting value of a predetermined thickness in the slice data, whereby it is possible for the user to set various setting values by operating the operation unit 104. The interpolation slice data includes a three-dimensional interpolation shape (e.g., pixel information) and a three-dimensional shape (e.g., pixel information) of the n-th material.

Figure 5A:
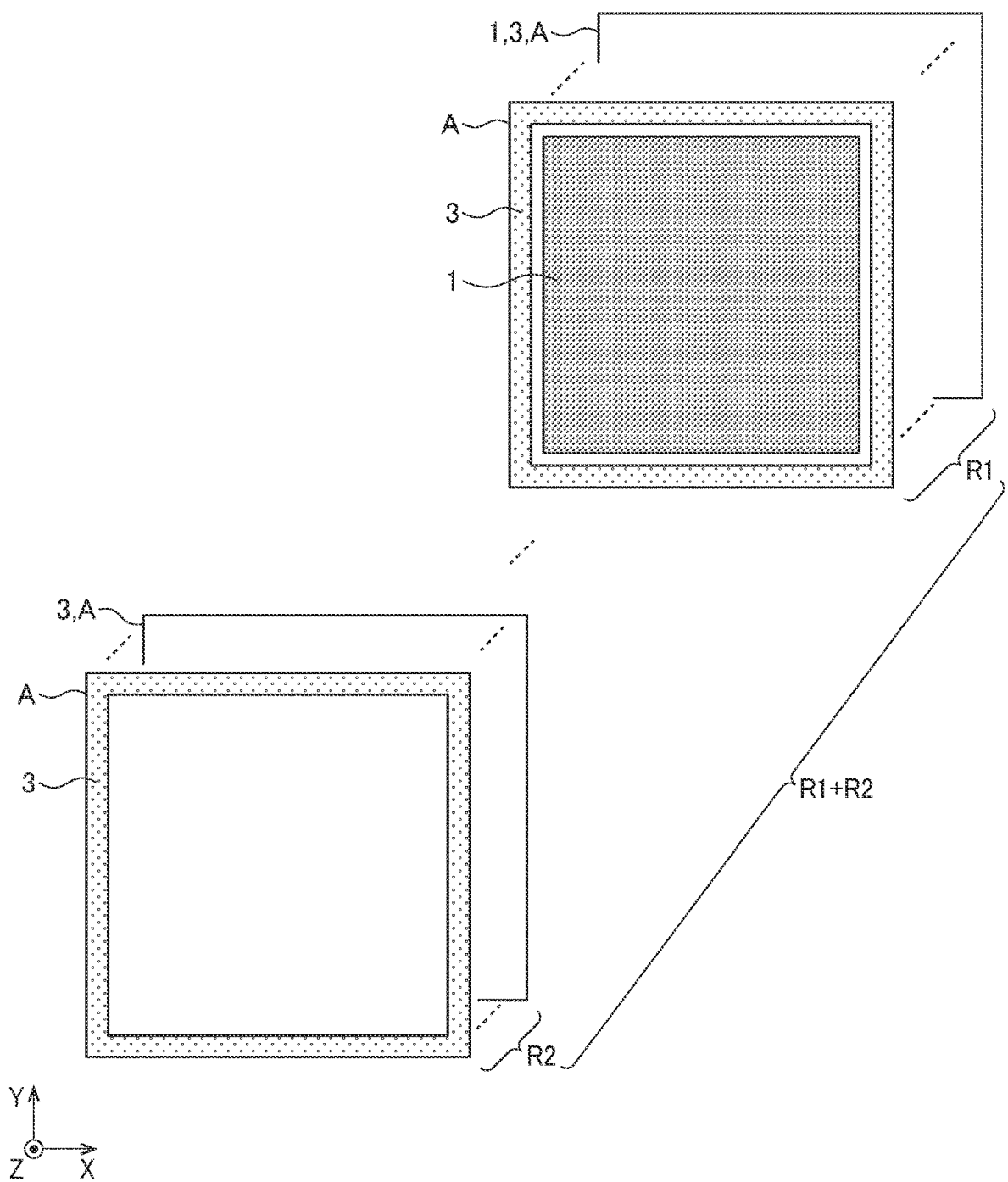
FIG. 5A is a diagram showing an example of interpolation slice data obtained by slicing the three-dimensional shape 1 and the three-dimensional interpolation shape 3 in the three-dimensional interpolation shape data shown in FIGS. 4A to 4C in the XY plane.

An example of the interpolation slice data will be described with reference to FIG. 5A. FIG. 5A is a diagram of an example of interpolation slice data obtained by slicing the three-dimensional shape 1 and the three-dimensional interpolation shape 3 in the three-dimensional interpolation shape data shown in FIGS. 4A to 4C in the XY plane. As shown in FIG. 5A, the interpolation slice data is generated by the number of layers of the outline A defined by the three-dimensional interpolation shape 3, i.e., the number of layers of the region R1 and the region R2, in the Z direction. Further, the interpolation slice data is generated in the XY plane by the outline A defined by the three-dimensional interpolation shape 3, i.e., the size (volume).

Next, the three-dimensional interpolation shape 3 is deleted from the plurality of interpolation slice data so as to leave information of the outline A defined by the three-dimensional interpolation shape 3, and a plurality of slice data (three-dimensional print data) of the three-dimensional shape of the n-th material are generated (shape deletion step, S6). The slice data defines a three-dimensional shape (e.g., pixel information) of the n-th material.

Figure 6A:
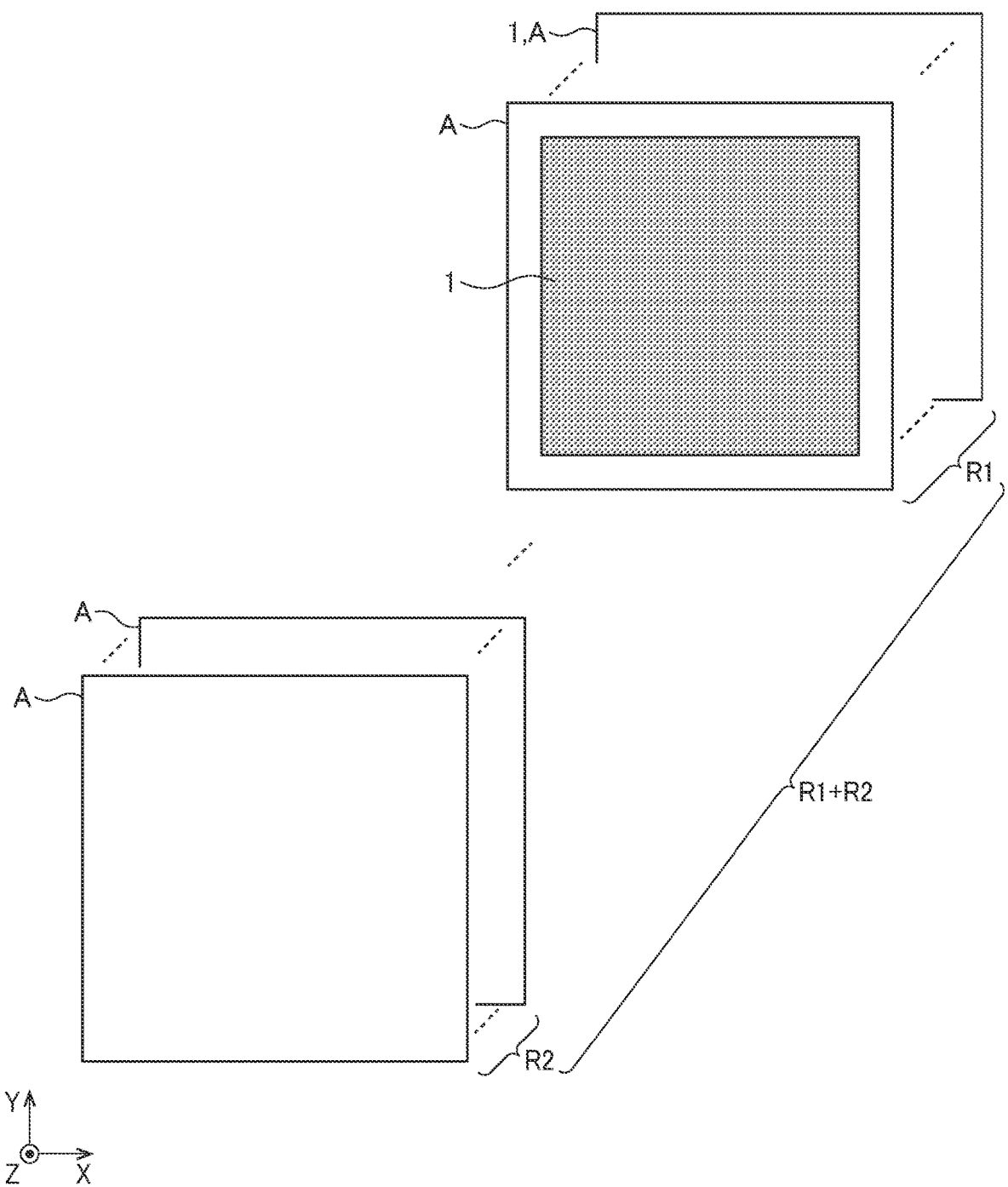
FIG. 6A is a diagram of an example of slice data corresponding to the interpolation slice data shown in FIG. 5A.

An example of the slice data will be described with reference to FIG. 6A. FIG. 6A is a diagram of an example of slice data corresponding to the interpolation slice data shown in FIG. 5A. As shown in FIG. 6A, the slice data is generated by the number of layers of the outline A defined by the three-dimensional interpolation shape 3, i.e., the number of layers of the region R1 and the region R2, in the Z direction. The slice data is generated by the outline A defined by the three-dimensional interpolation shape 3, i.e., the size (volume) in the XY plane.

Next, the increment variable n is incremented by 1 (S7). Next, it is determined whether or not the increment variable n exceeds the number of kinds of materials N (S8).

When the increment variable n is equal to or smaller than the number of kinds of materials N, the processing returns to step S4 to repeat the above-described processing of steps S4 to S8.

Figure 5B:
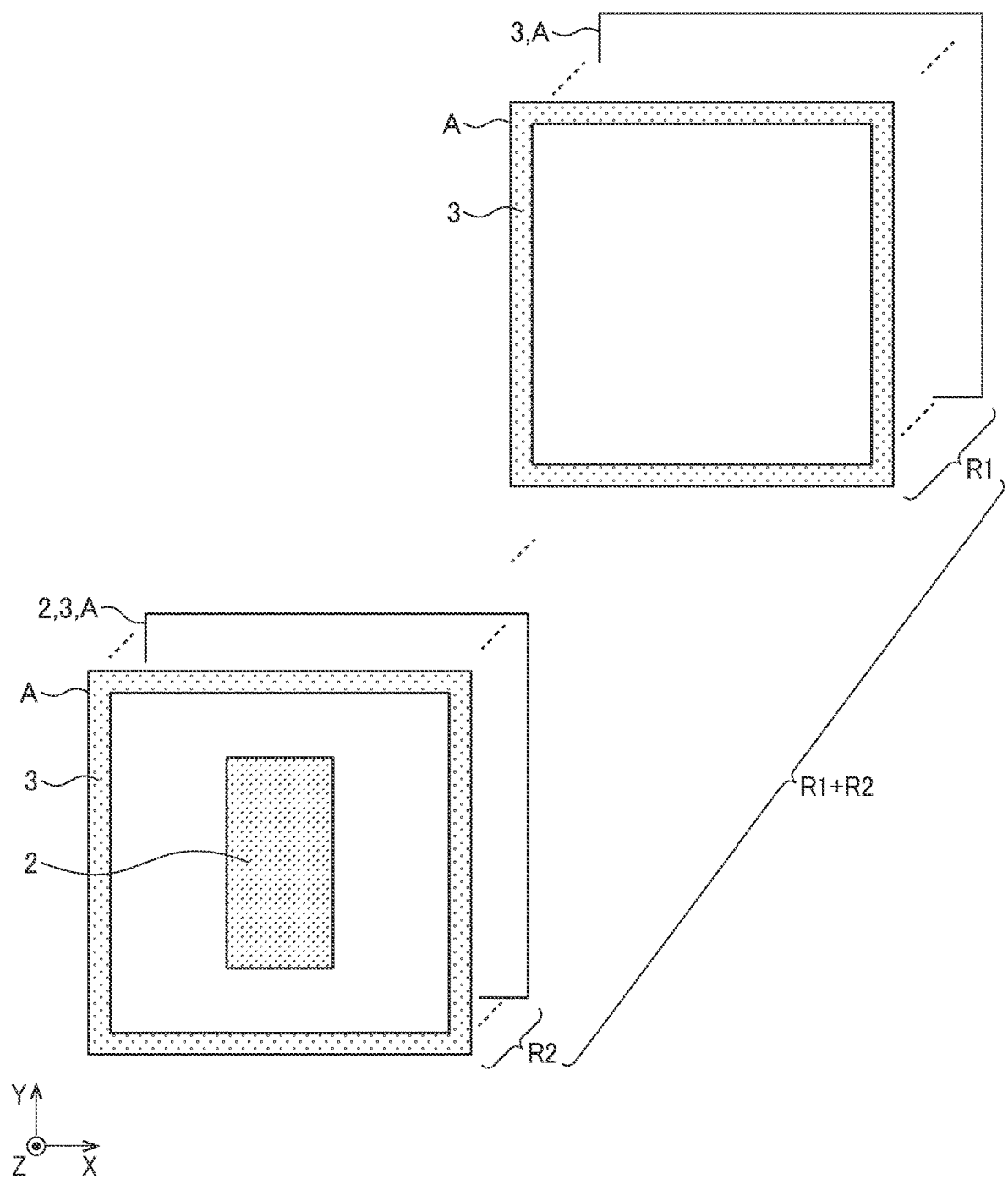
FIG. 5B is a diagram of an example of interpolation slice data obtained by slicing the three-dimensional shape 2 and the three-dimensional interpolation shape 3 in the three-dimensional interpolation shape data shown in FIGS. 4A to 4C in the XY plane.

FIG. 5B is a diagram of an example of interpolation slice data obtained by slicing the three-dimensional shape 2 and the three-dimensional interpolation shape 3 in the three-dimensional interpolation shape data shown in FIGS. 4A to 4C in the XY plane. As shown in FIG. 5B, the interpolation slice data is generated by the number of layers of the outline A defined by the three-dimensional interpolation shape 3, i.e., the number of layers of the region R1 and the region R2, in the Z direction. Further, the interpolation slice data is generated by the outline A defined by the three-dimensional interpolation shape 3, i.e., the size, in the XY plane.

Figure 6B:
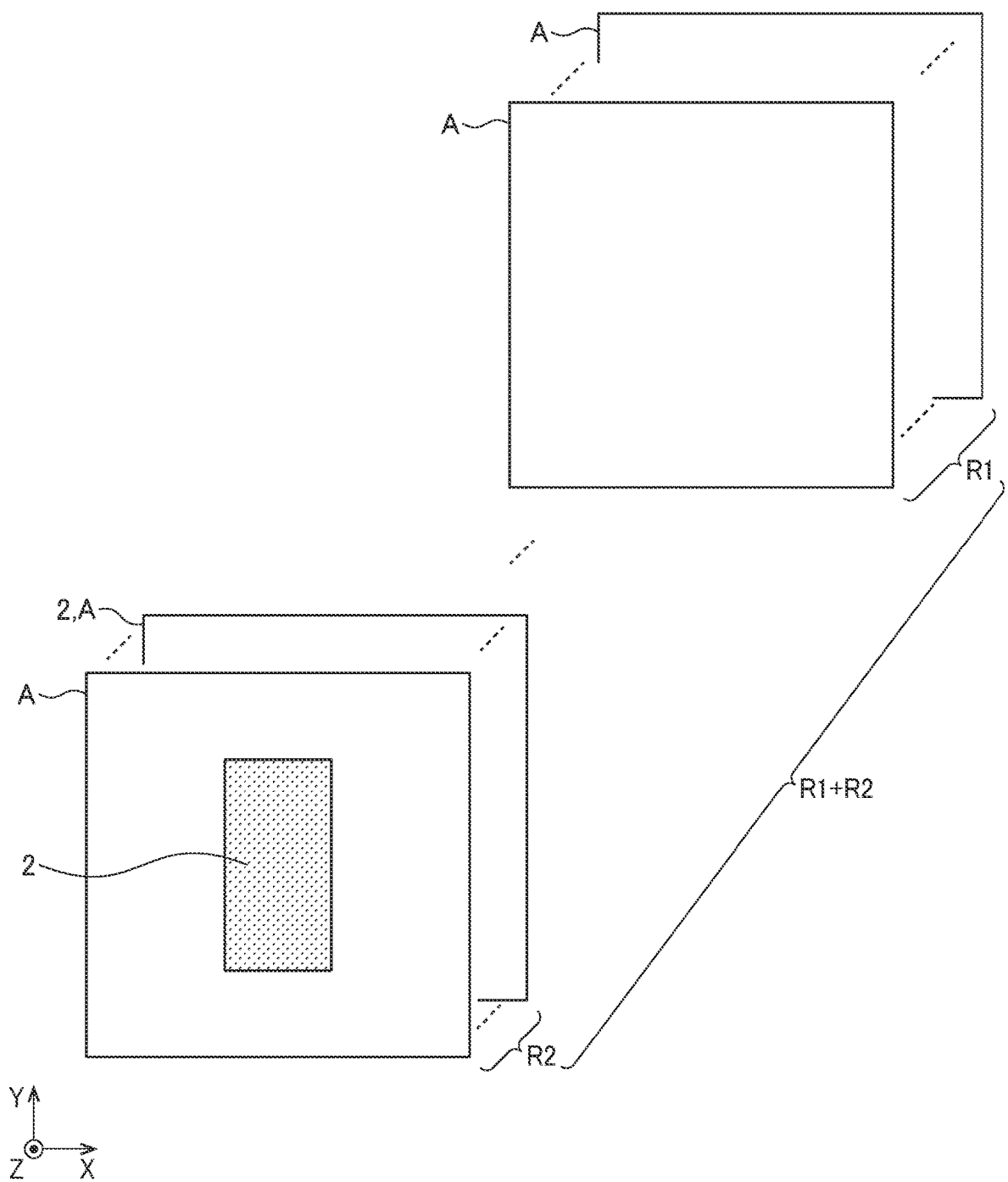
FIG. 6B is a diagram of an example of slice data corresponding to the interpolation slice data shown in FIG. 5B.

FIG. 6B is a diagram of an example of slice data corresponding to the interpolation slice data shown in FIG. 5B. As shown in FIG. 6B, the slice data is generated by the number of layers of the outline A defined by the three-dimensional interpolation shape 3, i.e., the number of layers of the region R1 and the region R2, in the Z direction. The slice data is generated by the outline A defined by the three-dimensional interpolation shape 3, i.e., the size in the XY plane.

In this way, by repeating the processing of steps S3 to S8 by the number of kinds of materials N, in the slice step (S5), the three-dimensional shape and the three-dimensional interpolation shape are simultaneously sliced for each of the N kinds of three-dimensional shapes in the three-dimensional interpolation shape data to generate a plurality of pieces of interpolation slice data, and in the shape deletion step (S6), the three-dimensional interpolation shape is deleted from the plurality of pieces of interpolation slice data so that the outline information defined by the three-dimensional interpolation shape remains, whereby a plurality of pieces of slice data are generated as three-dimensional print data. Thus, as described above, the slice data is generated by the number of layers defined by the three-dimensional interpolation shape 3 in the Z direction. The slice data is generated with a size defined by the three-dimensional interpolation shape 3 in the XY plane.

On the other hand, when the increment variable n exceeds N in step S8, the three-dimensional print data generation processing is terminated.

Figure 7A:
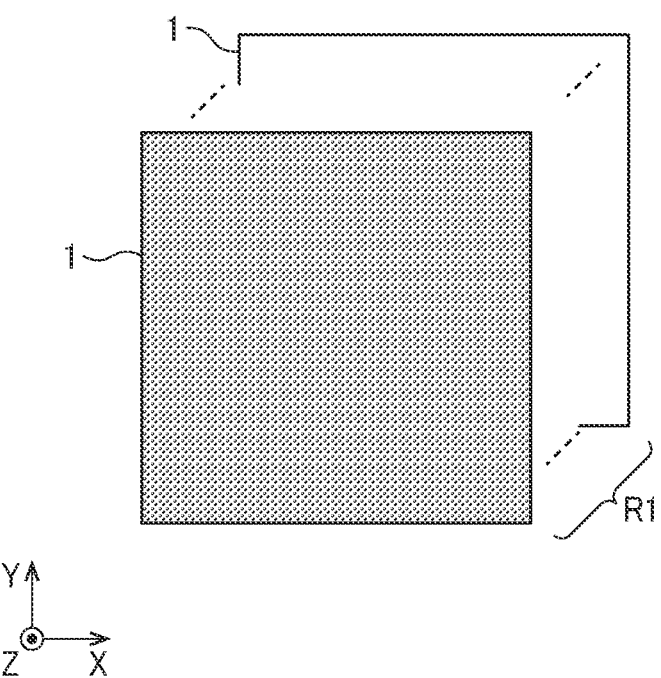
FIG. 7A is a diagram of an example of slice data obtained by slicing the three-dimensional shape 1 in the three-dimensional shape data shown in FIGS. 3A to 3C on the XY plane.
Figure 7B:
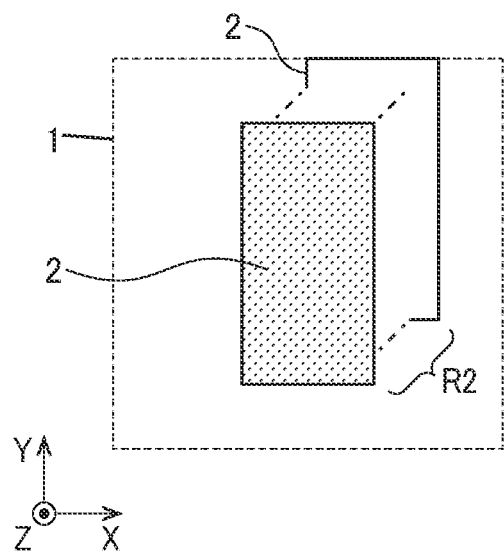
FIG. 7B is a diagram of an example of slice data obtained by slicing the three-dimensional shape 2 in the three-dimensional shape data shown in FIGS. 3A to 3C on the XY plane.

Now, consider a case where two three-dimensional shapes 1 and 2 overlapping with each other in the Z direction in the three-dimensional shape data shown in FIGS. 3A to 3C are sliced as they are. In this case, as shown in FIG. 7A, the slice data of the three-dimensional shape 1 is generated by the number of layers of only the region R1 of the three-dimensional shape 1 in the Z direction and by the size of the three-dimensional shape 1 in the XY plane. On the other hand, as shown in FIG. 7B, the slice data of the three-dimensional shape 2 is generated by the number of layers of only the region R2 of the three-dimensional shape 2 in the Z direction and by the size of the three-dimensional shape 2 in the XY plane. Then, the number of layers of the slice data of the three-dimensional shape 1 is different from the number of layers of the slice data of the three-dimensional shape 2. Further, the size of the slice data of the three-dimensional shape 1 is different from the size of the slice data of the three-dimensional shape 2.

In this regard, according to the three-dimensional print data generation apparatus 100 and the three-dimensional print data generation method of the present embodiment, as shown in FIGS. 6A and 6B, both slice data of three-dimensional shape 1 and slice data of three-dimensional shape 2 are generated by the number of layers of the outline A defined by three-dimensional interpolation shape 3, i.e., the number of layers of regions R1 and R2, in the Z direction, and are generated by the outline A defined by three-dimensional interpolation shape 3, i.e., the size in the XY plane. With such a configuration, it is possible for the number and size of the slice data of the three-dimensional shape 1 and the number and size of the slice data of the three-dimensional shape 2 to match with each other.

Next, a method of manufacturing a three-dimensional shaped article according to the present embodiment will be described. The three-dimensional printer 300 three-dimensionally prints the three-dimensional print data supplied from the three-dimensional print data generation apparatus 100 using the three-dimensional print data generated by the three-dimensional print data generation method described above, thereby manufacturing a three-dimensional shaped article. Specifically, the three-dimensional printer 300 sequentially deposits materials on the XY plane (the deposition surface) for each of N kinds of materials, and sequentially stacks the materials in the Z direction (the stacking direction) for each of N kinds of materials. For example, as shown in an example of FIGS. 6A and 6B, materials indicated by material information are assigned to the three-dimensional shape (solid body) 1 and the three-dimensional shape (solid body) 2, respectively, and three-dimensional printing (additive manufacturing) is performed.

The three-dimensional shaped article made of a plurality of materials is not particularly limited, and examples thereof include a multilayer ceramic electronic component in which an electric conductor and an insulator (dielectric) are laminated. The three-dimensional print data generation apparatus 100 and the three-dimensional print data generation method described above can be suitably applied to the generation of slice data (three-dimensional print data) used for manufacturing such a multilayer ceramic electronic component.

Although embodiments of the present disclosure have been described above, the present disclosure is not limited to the embodiments described above, and various changes, modifications, and combinations thereof are possible. For example, in the above-described embodiment, as the three-dimensional interpolation shape 3, a frame shape surrounding the maximum outline of the three-dimensional shapes 1 and 2 in the XY plane is exemplified. However, the present disclosure is not limited thereto and, for example, the three-dimensional interpolation shape 3 may be a column shape provided at four positions of the corners in the XY plane, or may be a column shape provided at least at two positions of the corners on the diagonal line in the XY plane, as shown in FIGS. 8A and 8B.

Figure 8A:
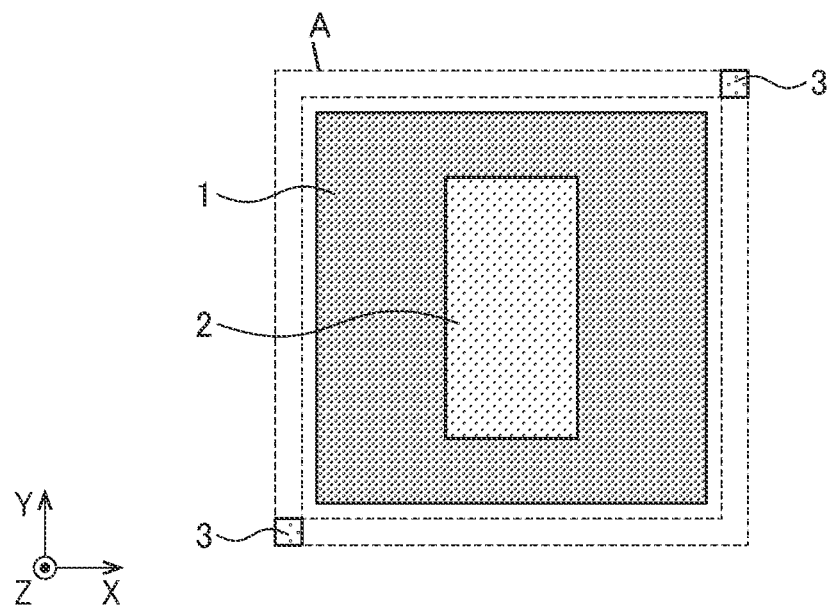
FIG. 8A is an XY plan view of a three-dimensional shape and a three-dimensional interpolation shape in three-dimensional interpolation shape data of a modified example.
Figure 8B:
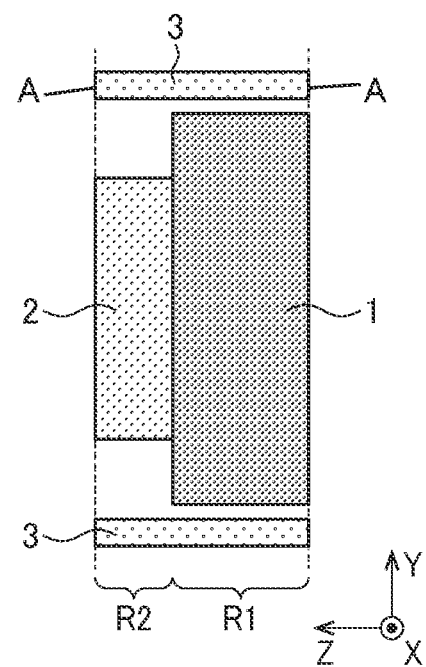
FIG. 8B is a side view, i.e., a YZ plan view, of the three-dimensional shape and the three-dimensional interpolation shape shown in FIG. 8A.

Also in this embodiment, it is still possible to define the outline A in the three-dimensional print data as indicated by a broken line in FIGS. 8A and 8B, as long as the outline A is provided outside the maximum outline of the plurality of three-dimensional shapes 1 and 2 in the XY plane, and is continuous in a parallel manner in the Z direction from the lowest end to the uppermost end of the plurality of three-dimensional shapes in the Z direction (the stacking direction of three-dimensional prints), i.e., in the region R1 and the region R2. More specifically, it is possible for the three-dimensional interpolation shape 3 to align the minimum coordinate value and the maximum coordinate value in the X direction and the minimum coordinate value and the maximum coordinate value in the Y direction (i.e., the size of the slice data) in a plurality of slice data for each material. Further, it is possible for the three-dimensional interpolation shape 3 to align the minimum coordinate value and the maximum coordinate value (i.e., the number of layers of slice data) in the Z direction in a plurality of slice data for each material. As in this modified example, when the three-dimensional interpolation shape 3 is a column shape provided at four corners in the XY plane or at least at two corners on a diagonal line, the outline A of the XY plane in the slice data is a rectangular shape. On the other hand, as in the embodiment described above, when the three-dimensional interpolation shape 3 is a frame shape surrounding the maximum outlines of the three-dimensional shapes 1 and 2 in the XY plane, the three-dimensional interpolation shape 3 can be applied to slice data defining various outlines A in the XY plane.

Further, in the above-described embodiment, a method of generating three-dimensional print data of three-dimensional shape data defining a rectangular shape in the XY plane, the YZ plane, and the XZ plane has been exemplified. However, the present disclosure is not limited thereto, and can be applied to a method of generating three-dimensional print data of various three-dimensional shape data.

Further, in the above-described embodiment, a method of generating three-dimensional print data of three-dimensional shape data including one kind of material in the XY plane has been exemplified. However, the present disclosure is not limited thereto, and can also be applied to a method of generating three-dimensional print data of shape data including two or more kinds of materials in the XY plane.

EXPLANATION OF REFERENCE NUMERALS 1, 2 three-dimensional shape
3 three-dimensional interpolation shape
100 three-dimensional print data generation apparatus
101 input/output unit
102 data processing unit
103 storage unit
104 operation unit
105 display unit
110 recording medium
200 three-dimensional shape data generation apparatus
300 three-dimensional printer

The invention claimed is:

1. A method of generating three-dimensional print data including a plurality of pieces of slice data for a three-dimensional print that deposits a material on a deposition surface and stacks the material in a stacking direction intersecting the deposition surface based on three-dimensional shape data,
the three-dimensional shape data defining a plurality of three-dimensional shapes formed by the three-dimensional print, and
the plurality of three-dimensional shapes excluding non-manifolds, not intersecting each other, and being made of different materials from each other,
the method comprising:
interpolating a three-dimensional interpolation shape in the three-dimensional shape data and generating three-dimensional interpolation shape data that defines the plurality of three-dimensional shapes and the three-dimensional interpolation shape, wherein the three-dimensional interpolation shape is an interpolation shape for defining an outline in the plurality of pieces of slice data, provided outside a maximum outline corresponding to the plurality of three-dimensional shapes on the deposition surface of the three-dimensional print, and is continuous from a lowest end to an uppermost end of the plurality of three-dimensional shapes as defined by the three-dimensional interpolation shape data corresponding to the stacking direction of the three-dimensional print;
slicing the respective three-dimensional shape and the three-dimensional interpolation shape for each of the plurality of three-dimensional shapes in the three-dimensional interpolation shape data, and generating a plurality of pieces of interpolation slice data therefrom; and
deleting the three-dimensional interpolation shape from the plurality of pieces of interpolation slice data to leave outline information defined by the three-dimensional interpolation shape, and generating the plurality of pieces of slice data therefrom.

2. The method of generating three-dimensional print data according to claim 1, wherein the three-dimensional interpolation shape is a frame shape that surrounds the maximum outline corresponding to the plurality of three-dimensional shapes on the deposition surface of the three-dimensional print.

3. The method of generating three-dimensional print data according to claim 2, wherein an inner periphery of the three-dimensional interpolation shape is larger than an outer periphery of the maximum outline corresponding to the plurality of three-dimensional shapes.

4. The method of generating three-dimensional print data according to claim 2, wherein the three-dimensional print data is data for forming the three-dimensional print using a material extrusion method, a material jetting method, or a binder jetting method.

5. The method of generating three-dimensional print data according to claim 1, wherein the three-dimensional interpolation shape is a column shape provided at least at two locations on a diagonal line of the maximum outline corresponding to the plurality of three-dimensional shapes on the deposition surface of the three-dimensional print.

6. The method of generating three-dimensional print data according to claim 5, wherein an inner periphery of the three-dimensional interpolation shape is larger than an outer periphery of the maximum outline corresponding to the plurality of three-dimensional shapes.

7. The method of generating three-dimensional print data according to claim 5, wherein the three-dimensional print data is data for forming the three-dimensional print using a material extrusion method, a material jetting method, or a binder jetting method.

8. The method of generating three-dimensional print data according to claim 1, wherein an inner periphery of the three-dimensional interpolation shape is larger than an outer periphery of the maximum outline corresponding to the plurality of three-dimensional shapes.

9. The method of generating three-dimensional print data according to claim 8, wherein the three-dimensional print data is data for forming the three-dimensional print using a material extrusion method, a material jetting method, or a binder jetting method.

10. The method of generating three-dimensional print data according to claim 1, wherein the three-dimensional print data is data for forming the three-dimensional print using a material extrusion method, a material jetting method, or a binder jetting method.

11. A method of manufacturing a three-dimensional shaped article comprising performing three-dimensional printing to manufacture a three-dimensional shaped article using three-dimensional print data generated by a three-dimensional print data generation method according to claim 1.

12. A method of manufacturing a three-dimensional shaped article comprising performing three-dimensional printing to manufacture a three-dimensional shaped article using three-dimensional print data generated by a three-dimensional print data generation method according to claim 2.

13. A method of manufacturing a three-dimensional shaped article comprising performing three-dimensional printing to manufacture a three-dimensional shaped article using three-dimensional print data generated by a three-dimensional print data generation method according to claim 5.

14. A method of manufacturing a three-dimensional shaped article comprising performing three-dimensional printing to manufacture a three-dimensional shaped article using three-dimensional print data generated by a three-dimensional print data generation method according to claim 8.

15. A method of manufacturing a three-dimensional shaped article comprising performing three-dimensional printing to manufacture a three-dimensional shaped article using three-dimensional print data generated by a three-dimensional print data generation method according to claim 10.

16. A method of manufacturing a three-dimensional shaped article comprising performing three-dimensional printing to manufacture a three-dimensional shaped article using three-dimensional print data generated by a three-dimensional print data generation method according to claim 3.

17. A method of manufacturing a three-dimensional shaped article comprising performing three-dimensional printing to manufacture a three-dimensional shaped article using three-dimensional print data generated by a three-dimensional print data generation method according to claim 6.

18. A method of manufacturing a three-dimensional shaped article comprising performing three-dimensional printing to manufacture a three-dimensional shaped article using three-dimensional print data generated by a three-dimensional print data generation method according to claim 4.

19. A method of manufacturing a three-dimensional shaped article comprising performing three-dimensional printing to manufacture a three-dimensional shaped article using three-dimensional print data generated by a three-dimensional print data generation method according to claim 7.

20. A method of manufacturing a three-dimensional shaped article comprising performing three-dimensional printing to manufacture a three-dimensional shaped article using three-dimensional print data generated by a three-dimensional print data generation method according to claim 9.

* * * * *